Sept. 18, 1973   G. W. BROWN ET AL   3,759,770
FRICTION WELDING MACHINE LOADING AND HOLDING APPARATUS
Filed July 6, 1971   3 Sheets-Sheet 3
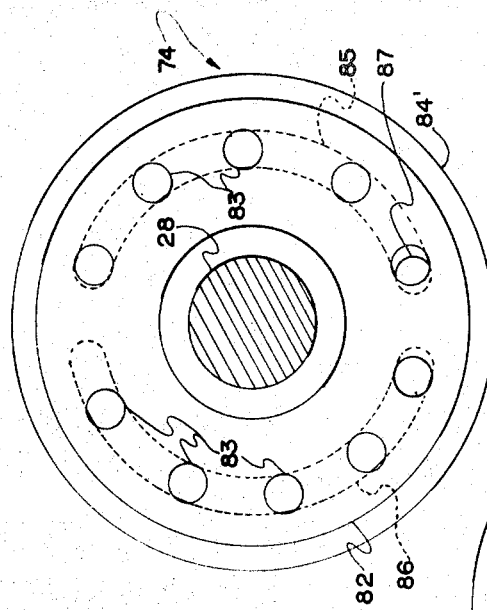
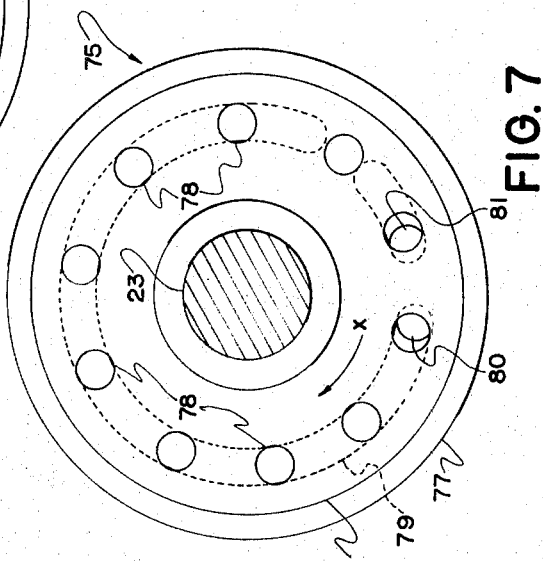
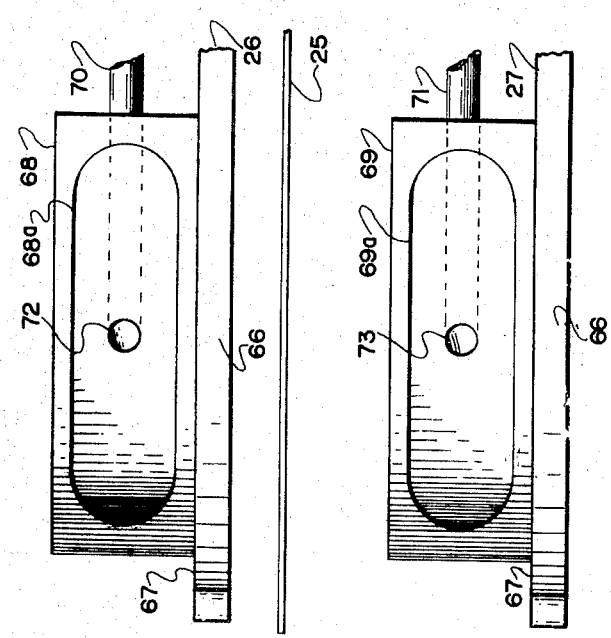
INVENTOR.
GAYLORD W. BROWN
GARY A. ADAMS
BY
*Learman & McCulloch*

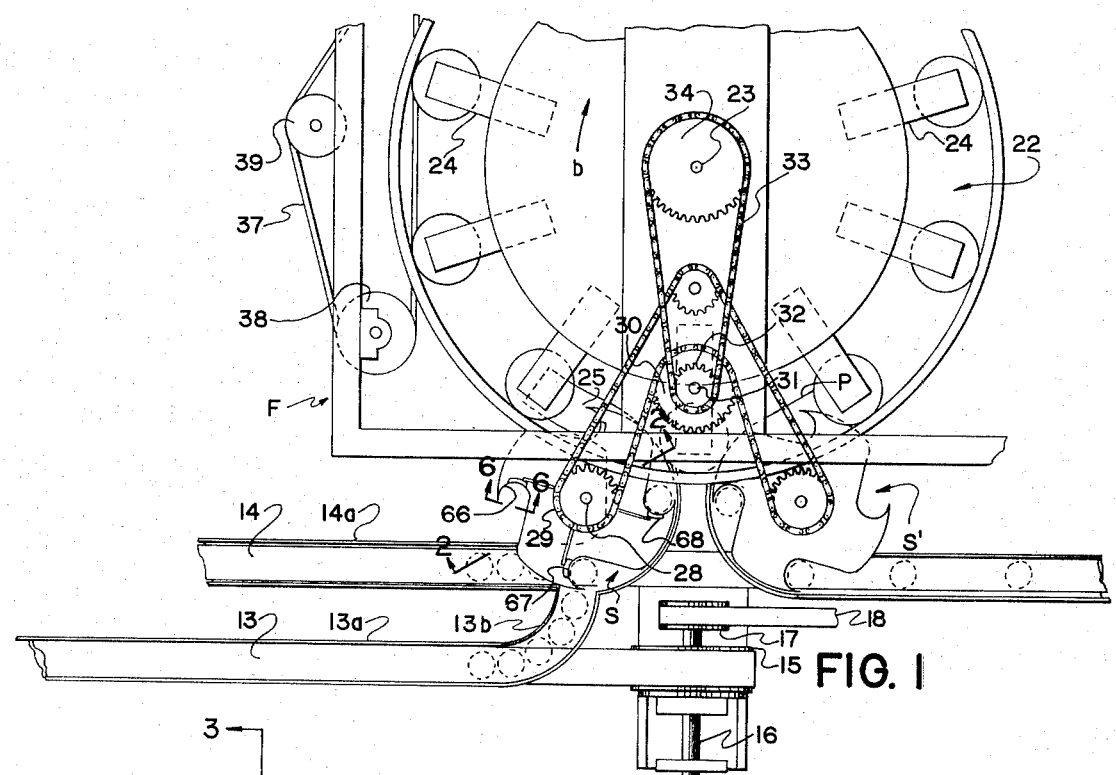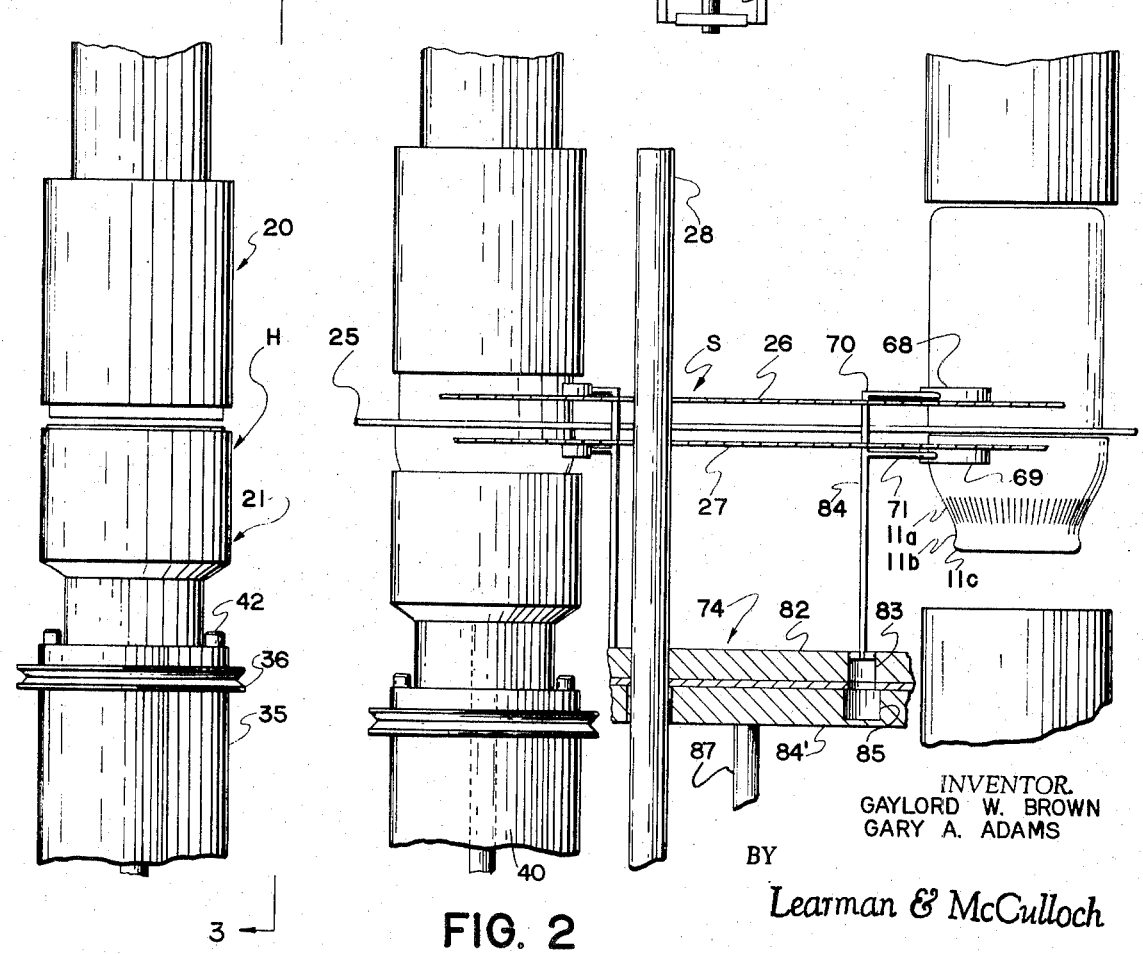

United States Patent Office 3,759,770
Patented Sept. 18, 1973

3,759,770
FRICTION WELDING MACHINE LOADING AND HOLDING APPARATUS
Gaylord W. Brown and Gary A. Adams, Beaverton, Mich., assignors to Koehring Company
Filed July 6, 1971, Ser. No. 159,883
Int. Cl. B29c 27/08; B32b 31/00
U.S. Cl. 156—73
14 Claims

ABSTRACT OF THE DISCLOSURE

Friction welding machinery for joining thermoplastic container top and bottom parts which are moved continuously along a production line. Star wheel loading and unloading members incorporate suction pads for gripping the parts as they move to the holders where flutes, in at least some of the holders, communicate suction chambers in the holders with a vacuum source, and also hold the parts during the friction welding operation.

This invention relates to friction welding apparatus for joining thermoplastic, synthetic plastic container parts, and more particularly to container part loading, aligning and receiving members for moving the parts to and holding them in a position which permits them to be friction welded together.

Prior art machiney is exemplified in the present assignee's U.S. Pat. No. 3,297,504 and application Ser. No. 830,668, filed June 5, 1969 and entitled "Spin Welding Holder and Loading Apparatus," now U.S. Pat. No. 3,607,581, issued Sept. 21, 1971.

The present machine is well adapted to the friction welding of two adjoining parts to form relatively small, light weight containers such as used, for example, for single-servings of orange juice. Machinery downstream from the machine to be illustrated and described is employed to fill the containers formed with the product, and other machinery then secures tops or caps to the container bodies formed. Because the parts involved in this particular operation are relatively small and light weight, and because they are of somewhat different configuration and must be processed at such exceedingly high rates, new and improved machinery is required to properly load, align, and hold the parts so that they may be efficiently and reliably friction welded to form container bodies.

For example, where previously it has been possible to mechanically grip one of the two parts to be joined together, in the present instance, the parts are so small and of such configuration that mechanical gripping utilizing prior art mechanisms is a different operation to reliably perform. Also, in prior art machines, where larger parts were handled, the same problems were not encountered in moving parts to the holding mandrels and receiving them in properly aligned position. In the present instance, it has been found necessary to utilize new techniques and concepts in loading the container parts to the holders which receive them, and in properly aligning or positioning them, without cocking them.

One of the prime objects of the present invention is to provide holder mechanism incorporating flutes or grooves which serve to drive the container part with the holder at the desired time in the spin welding operation to rotate the one part relative to the other, and which function also as vacuum duct passages for communicating suction chambers, which facilitate the properly aligned reception of the parts inthe holders, with a vacuum source.

Another object of the invention is to provide machinery of the character indicated, including holders having positioning mandrels within the holder shells, to center and position the parts therein.

Still another object of the invention is to provide port means for breaking any vacuum inadvertently communicating with the interior of the gripped parts in the holder which might have a tendency to collapse the joined container parts.

Still a further object of the invention is to provide star wheel mechanism for moving the parts to position with suction pads which are activated and deactivated at proper times to carry the lowermost parts to be joined to the holder shelves and then to release them at the proper time.

A further object of the invention is to provide auxiliary container gripping mechanism for holding the container tops in position, which also function to center and position the parts within the holder.

A further object of the invention still is to provide efficient and reliable machinery for joining container parts at extremely high rates of production, consonant with the operations performed by other machinery in the production line so that slowed speeds of operation of conjunctive machinery utilized to perform other operations in the production line are not required.

Other objects and advantages of the invention will be pointed out specifically or will become apparent from the following description, when it is considered in conjunction with the appended claims and the accompanying drawings, in which:

FIG. 1 is a fragmentary, top plan view showing the manner in which container parts are delivered to the friction welding machine;

FIG. 2 is a considerably enlarged, fragmentary, side elevational view taken on the line 2—2 of FIG. 1 to show the manner in which the top and bottom parts are delivered to and received within the upper and lower holder shells;

FIG. 6 is a greatly enlarged, sectional, side elevational view taken on the line 6—6 of FIG. 1;

FIG. 7 is a schematic, partly sectional, view illustrating typical mechanism for supplying air under pressure to the holders and alternately communicating them with a vacuum pump;

FIG. 8 is a schematic, fragmentary, sectional plan view illustrating mechanism for selectively communicating the star wheel suction pads with a vacuum source.

Referring now particularly to the accompanying drawings, and in the first instance to FIGS. 1 and 2, it will be seen that the views are similar to FIGS. 7 and 8, respectively, of the previously mentioned U.S. Pat. No. 3,297,504, and to FIGS. 1 and 2 of the application previously mentioned, both of which are incorporated herein by reference. These views in the prior assignees' patent and application show a machine of the same general character for assembling and joining thermoplastic container sections or parts by friction or spin welding, but it is to be understood that the present machine must handle container parts of different configuration, size and weight, and that additional and different mechanisms have been employed in the present instance to permit the machine to handle the container parts which now will be described.

Figure 3:
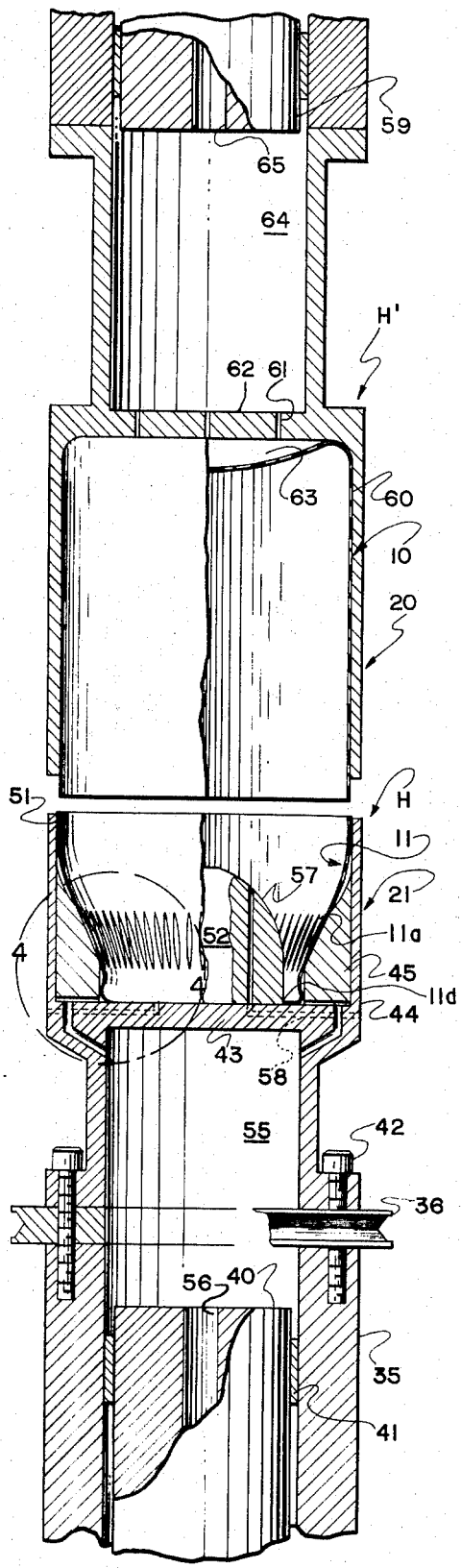
FIG. 3 is a considerably more enlarged, fragmentary, sectional, side elevational view taken on the line 3—3 of FIG. 2, and showing the parts in the holders just prior to the time they are moved into interfitting relationship.

A container of the character to be friction welded is shown in the present assignees' design patent application D. 25092 filed Sept. 21, 1970 by inventors, Gaylord W. Brown and Robert T. Johnson. The parts which are joined to fabricate the container are shown in FIG. 3 of the present application as comprising a container base part, generally designated 10, and a container top part, generally designated 11. In the present instance, for purposes of convenience, the container is shown being assembled in inverted disposition but it should be clear that it could, if desired, be friction welded with the parts 10 and 11 in an upright position. The container to be formed from the parts described herein is particularly designed for holding single servings of orange juice and is relatively small in size and light in weight.

Figure 4:
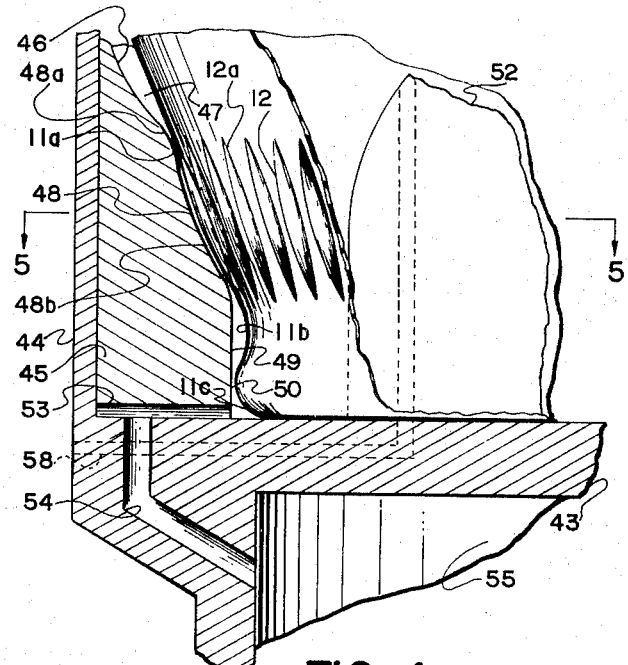
FIG. 4 is a greatly enlarged view of the portion of FIG. 3 bounded by circle 4 in FIG. 3.

The container top part 11 includes a necked-in portion 11a leading to a neck 11b which terminates in a radially in-turned flange 11c in which the opening 11d is punched. The neck portion 11c is configured to receive a hermetically sealed foil cap. Provided in the portion 11b of the container part 11 are circumferentially spaced, generally axially extending grooves 12 which have tapered ends 12a, as shown more particularly in FIG. 4. The manner in which the part 11 is received in its holder will be described in detail later on in this specification.

The present machine is designed to operate in a continuous manner to join the continuously supplied and moving parts 10 and 11. As indicated earlier, other machinery located downstream from the present machine will later apply a top to the top part 11 to close the open top thereof once the containers have been filled with product. As in the patent mentioned, conveyors 13 and 14 (FIG. 1) are provided for delivering parts 10 and 11, respectively, to delivery star wheel mechanism, generally designated S. The conveyors 13 and 14 may comprise endless belt conveyors which include side guide rails 13a and 14a respectively. It is to be understood that the belt conveyor 13 is elevated with respect to the belt conveyor 14 and is passed around a front pulley member 15 on a shaft 16 which may be continuously driven via a pulley 17 and a drive belt 18. A curved platform 13b communicates conveyor 13 with start wheel assembly S. The belt conveyor 14 extends beyond the front end of the conveyor 13 and also serves as an exit conveyor for receiving the joined container parts 10 and 11 from an exit star wheel assembly, generally designated S'.

Also, as in the patent mentioned, the container parts 10 and 11 are delivered to vertically movable upper and lower part-holding assemblies, generally designated 20 and 21 (see FIG. 3), mounted in the same manner in vertically aligned concentric relationship on a continuously moving rotary carrier structure, generally designated 22. The carrier structure 22 is mounted for rotation in a central drive shaft 23 to move clockwisely in FIG. 1 in the direction b, shaft 23 being driven continuously by a motor (not shown) as before. Upper and lower radially extending support arms 24 extend from the carrier structure 22, as previously, to support the upper and lower holder assemblies 20 and 21. A support shelf or table member 25 leads from the star wheel mechanism S, as shown in FIGS. 2 and 6, to support the parts 10 as they are moving to the upper holder assembly 20 and to guide the parts 11 as they are moving beneath it to the lower part holder assembly 21.

As particularly indicated in FIG. 2, the delivery star wheel mechanism S comprises a lower part delivering upper star wheel 26 and an identical upper part delivering lower star wheel 27, each mounted for rotation with a shaft 28 which may be driven as before, by a chain 29 trained around a sprocket 30 and a sub-shaft 31. It will be seen that the shaft 31 is driven by a sprocket 32 via a chain 33 trained around a sprocket 34 on the central drive shaft 23. As FIG. 2 also particularly indicates, the part-holder assembly 21 comprises rotatable spindle 35 mounting a pulley member 36 adapted to be orbited into engagement with a driven belt 37 (FIG. 1), as in the patent mentioned, once the container parts 10 and 11 have been loaded to the vertically movable upper and lower holder assemblies 20 and 21 respectively, and brought vertically into engaged relationship in a manner to be later described. The belt 37 is trained around a pulley system including an end pulley 38, an idler pulley 39 and an opposite end driven pulley (not shown).

Each rotatable spindle 35 is rotatably journaled on a stationary post 40, fixed to the machine frame F, via bearings 41. Bolts 42 may be provided to secure an upper holder shell H and also secure the pulley 37 in place.

Figure 5:
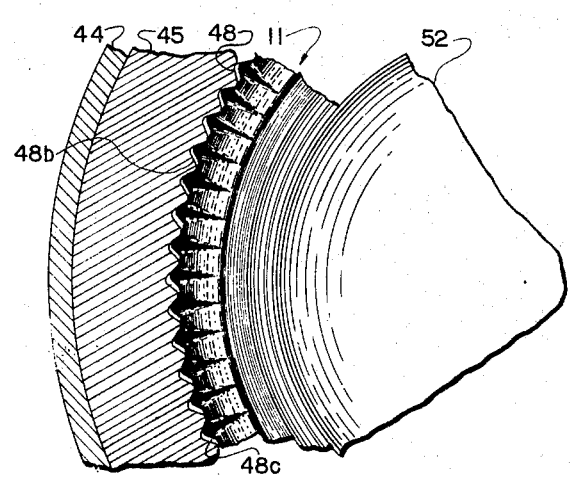
FIG. 5 is a fragmentary, sectional plan view taken on the line 5—5 of FIG. 4.

The holder H includes an end or bottom wall 43 and a perimetral wall 44. Provided within each holder ring 44 is a configured ring portion 45, having a curvilinear surface 46 which is enlarged relative to the part 11 to form a vacuum applying chamber 47 surrounding the part 11. Also provided in the ring 45 are grooves 48, tapered at their ends as at 48a, to match the groove ends 12a. As FIG. 4 particularly indicates, the axially inner portion of ring 45 is cyvlindrical as at 49 and spaced sufficiently from the side wall of the part 11 to provide a vacuum passage 50 leading to grooves 48 which, in turn, lead to suction chamber 47. The grooves 48 are enlarged as shown at 48b (FIG. 5), so as to provide vacuum ports 48c communicating the space 50 with the vacuum chamber 47, even when a part 11 is loaded into the holder H. At the outer end of holder H, the part 11 is of a diameter to engage the interior surface of wall 44 so that a seal is provided at point 51 all the way around the holder.

Mounted on end wall 43, a spaced distance inwardly of the ring portion 45, is a bullet-shaped mandrel 52 and the space between mandrel 52 and wall surface 49 is such that the lip portion 11c of part 11 is easily received therein. Vacuum is supplied to the annular chamber 50 via a series of circumferentially spaced lateral ports 53 communicating with ports 54 leading to the chamber 55 in holder assembly 21, which communicates with the port 56 in guide shaft 40. A vacuum source is selectively communicated with the passage 56 in a manner which will later be described. Also provided in each wall 43 and mandrel 52 are ports 57 and 58 respectively to continuously communicate the interior of part 11 with the outside atmosphere so that air being drawn out between the mandrel 52 and lip 11b does not create a vacuum condition in the interior of the joined parts 10 and 11, which would tend to collapse them.

Each upper holder assembly 20, while vertically movable, is prevented from rotating about its axis and is mounted for vertical up and down movement on a support rod 59, supported by one of the upper stationary support arms 24, on which the upper holder shell is mounted. Each assembly 20 includes a cup-shaped lower part 60 for receiving the part 10 and having vacuum ports 61 in an inner end wall 62 thereof to communicate a vacuum chamber 63 in holder 60 with a chamber 64 which, in turn, communicates with a port 65 provided in the shaft portion 59. A vacuum pump and air under pressure are selectively communicated with the passage 65 in a manner which will later be described.

As FIGS. 2 and 6 particularly indicate, the star wheel assembly S includes plates 26 and 27 with recesses 66 (FIG. 1) of approximately the diameter of parts 10 and 11 cut in them to form part-engaging arms 67. Provided on the outer face of each of the plates 26 and 27 and curved to the configuration 66 are curvilinear suction pads 68 and 69 respectively. Each of the pads 68 and 69 is recessed very slightly, as at 68a and 69a to provide vacuum applying chambers and lines 70 and 71 communicate with the chambers 68a and 69a via ports 72 and 73. The lines 70 and 71 lead to a vacuum control assembly 74 which will presently be described.

The vacuum control assembly 74 and the similar assemblies for applying vacuum and air alternately to the holder assemblies 20 and 21, are conventional units and form no part of the present invention, an assembly of this character is illustrated and described in the present assignee's patent application Ser. No. 729,056 entitled, "Mechanism for Removing Containers from Mandrels," filed May 14, 1968, now U.S. Pat. No. 3,587,816, issued June 28, 1971. The mechanism 75 for alternately applying a vacuum and air under pressure to the holder assembly 21, for example, may comprise a plate 76 fixed to shaft 23 to rotate therewith and a plate 77 which is fixed against rotation. The plate 76 has a series of through openings or bores 78, each of which communicates via an air hose (not shown) with one of the openings 56 in one of the holder assemblies 21. The fixed plate 77 includes a curvilinear recess 79 communicating via a bore 80 with a suitable source of vacuum, such as a vacuum pump. Also provided in fixed plate 77 is a port 81, communicating with a suitable source of air under pressure, such as an air compressor. With disc 76 rotating in the direction of the arrow x, plainly each of the openings 78 will be in communication with the vacuum source 80 during passage under recess 79 to apply a vacuum through the particular port 56 and hold the part 11 therein. When the particular opening 78, however, passes beneath air port 81, air under pressure will communicate with the particular opening 78 which supplies it to the particular port 56 and provides air for moving the friction-welded container out of the lower holder cup H. A similar control assembly is provided for supplying and releasing vacuum via the ports 65. Preferably the opening 81 will communicate simply with atmosphere rather than a source of air under pressure, however, and the vacuum will be maintained longer so that the container formed is released from the upper holder assembly 20 only just before discharge to the discharge star wheel assembly S'.

In FIG. 8 a similar control assembly is shown for selectively applying vacuum to the suction pads 68 and 69. The vacuum control assembly 74 includes the rotary plate 82, fixed to the star wheel shaft 28, and includes openings 83, each of which communicate with a line 84 leading to a set of the suction pads 68–69. Beneath rotary plate 82 is a fixed stationary plate 84' having a vacuum recess 85 provided in its upper face, as shown, and a bore or opening 86 communicating with atmosphere to break the vacuum at the desired time. Plainly, when one of the openings 83 is in communication with vacuum recess 85, which has a vacuum hose 87 leading from a vacuum source communicating therewith, vacuum will be applied to pads 68 and 69. When, however, the openings 83 communicate with atmospheric pressure port 86, the vacuum is broken and the star wheels 26–27 release the parts to the holder assemblies 20 and 21.

In operation, parts 10 are supplied on the conveyor 13 and parts 11 on the conveyor 14 to star wheels 26 and 27 respectively. At the time the star wheels 26 and 27 first rotate into engagement with the in-feeding parts 10 and 11 on conveyors 13 and 14 respectively, suction is applied via the recess 85 to the pads 68 and 69 so that the curvilinear pads grip the parts 10 and 11 and swing them through a partial arc across to platform 25. The star wheel plates 26 and 27 are, of course, rotated in synchronism with the shaft 23 for carrier assembly 22 and, as the parts 10 and 11 are moving with the star wheels, a pair of holder shell assemblies 20 and 21 are also moving in synchronism therewith. At the time the arcs of travel intersect, the holder assemblies 20 and 21 are vertically axially aligned with the parts 10 and 11. Platform 25 functions as a support for the upper part 10 and as a guide for the lower part 11. In FIG. 2, the holder assemblies 20 and 21 at the right end of the view are shown as having been rotated into a position of vertical, axial alignment with parts 10 and 11 to a position in which they can be moved vertically to receive the parts 10 and 11 as have the central holder assemblies 20 and 21 in FIG. 2.

As the holder shell assemblies 20 and 21 commence to move vertically to receive parts 10 and 11 respectively, the particular controlling opening 83 in plate 82 is moved beyond the vacuum slot 85 to the vacuum breaking port 86 and the star wheels 26 and 27 thus, in effect, release the parts 10 and 11 to the holder assemblies 20 and 21, which move vertically to receive the parts as indicated. Vertical movement of holder assemblies 20 and 21 is accomplished via stationary circular cam tracks on frame F in the manner described in the aforementioned Pat. No. 3,297,504. At the left in FIG. 2, the holder assemblies 20 and 21 are shown as having moved beyond the stationary platform 25. The parts 10 and 11 in this left-hand holder assembly 20–21 in FIG. 2 have not quite been brought into a relationship wherein the lower end of part 10 is received axially within part 11 so that friction welding can occur. This will occur, however, just after the time the drive pulley 36 for this assembly 20–21 is moved into engagement with the continuously driven belt 37 which is engaged by each pulley 36 to rotate each lower assembly 21 in the manner described in the aforementioned patent to accomplish the friction welding of parts 10 and 11 together.

Returning now to consider FIGS. 3–5 particularly, with respect to the operation of the machine, it is to be understood that vacuum is applied to the ports 56 and 65 of each of the holder assemblies 20 and 21, at the time the parts 10 and 11 reach a position of vertical axial alignment therewith, as shown at the right in FIG. 2. As the holder assembly 21 moves upwardly to receive the part 11, the lower portions 12a of the drive grooves 12 provided in part 11, function to pilot the part 11 and give it any necessary angular or rotational increment of movement needed to seat the grooves 12 within the grooves 48. During this time, the vacuum in manifold 55 is aiding in moving the part 11 into properly oriented position in the holder H, and mandrel 52 is also aiding in achieving this proper orientation and preventing any tendency of the part 11 to cock. Once the part 11 is fully received within the holder H, the vacuum applied to chamber 47 via passages 50 and 48b functions to hold the part 11 and, conjunctively with the grooves 48–12, to drive the part in a rotary path when pulley 36 engages belt 37 to perform the friction welding operation. The vacuum is maintained in each manifold 55 until the particular holder assembly 21 has passed beyond belt 37 and accomplish the inertial friction welding described in the aforementioned Pat. No. 3,297,504.

In a similar manner, vacuum is maintained in the manifold 64 of the upper part holder assembly 20 to hold the part 10 therein from a time commencing with the time the part 10 is first in vertical axial alignment with the cup-shaped part 60, until considerably after friction welding is accomplished. Once the friction welding is accomplished, the lower part holder assembly 21 moves downwardly, to a level below part 11. As downward movement first occurs, the particular control opening 78 for the particular holder assembly 21 has moved beyond vacuum slot 79, to the vacuum breaking air port 81 which creates an air pressure in the particular chamber 54 to initially assist the vacuum in upper holder chamber 63 in holding the now friction welded container within upper holder 60. As assembly 21 is moving downwardly, the upper assembly 20 is moving upwardly, and it is to be understood that vacuum is maintained in chamber 63 until such time as the joined container has completely cleared the lower assembly 21 and moved around to a position adjacent the discharge star wheel assembly S', where vacuum forces are broken and the joined container drops by gravity to the platform P adjacent star wheel assembly S' and is removed to the continuation of belt 14 for discharge. During the time that vacuum is applied to hold the part 11 in position, any tendency to evacuate the abutting containers during the friction welding operation is dissipated by atmosphere ports 58.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. In a friction welding machine:
   at least a pair of upper and lower holder shells, having part receiving cavities with entrance ends to which upper and lower parts to be friction welded together are fed;
   at least one of said shells including an interior surface formed partly to the configuration of the part to be received therein;
   means for feeding parts to said shells;
   circumferentially mating, circumferentially spaced, generally axially extending groove and projection means provided on said surface to mate with like groove and projection means on the part received by said surface;
   said one shell having an enlarged cavity portion relative to said part forming a part surrounding vacuum chamber means axially outward of said groove and projection means bounded by an outer portion which conforms to the shape of said part to outwardly seal said chamber;
   port means in said one holder shell for applying a vacuum to said chamber;
   means for selectively communicating a vacuum source with said port means to grip and release parts;
   means for holding an axially opposite part in the holder opposite and one holder; and
   means for relatively axially moving said holders to bring said parts into engagement and relatively revolving said holders to friction weld the parts.

2. The combination defined in claim 1 in which said groove means in the surface of said shell are of greater dimension than said projection means on the part to provide vacuum ports therein when a part is received and communicate said port means for applying a vacuum and said vacuum chamber.

3. The combination defined in claim 1 in which said one holder shell has an outer peripheral wall portion bounded by an inner end wall and a port is said end wall radially inwardly of said peripheral wall portion leads generally axially through said end wall and extends to communicate the atmosphere with the interior of a part in said holder to break any vacuum inside the part which would tend to collapse it.

4. The combination defined in claim 1 in which the groove and projection means includes grooves in said surface which are tapered at both ends.

5. The combination defined in claim 1 in which a pilot mandrel is provided on the inner end of said one shell circumferentially spaced from the shell interior wall to accommodate the part therebetween.

6. The combination defined in claim 5 in which a port extending generally axially in said mandrel has communication with the atmosphere to break any vacuum inside the part which would tend to collapse it.

7. The combination defined in claim 1 in which said means for feeding parts to said shells comprise supply conveyor means and rotatable star wheel means adjacent thereto with part-engaging arms having suction applying pads thereon to help move parts from said conveyor means to said holder shells.

8. The combination defined in claim 7 in which means communicates a suction source with said pads during only a portion of their travel to provide for release of parts to the holder shells.

9. In a friction welding machine:
   a carrier rotatable about an axis;
   pairs of relatively vertically movable upper and lower holder shells on said carrier, having part receiving cavities with entrance ends to which upper and lower parts to be friction welded together are fed;
   means for feeding parts to said shells comprising a star wheel assembly, with at least one star wheel thereon, disposed generally transversely to said shells at the periphery of said carrier and rotatable about an axis substantially parallel to the axis of rotation of said carrier;
   conveyor means for feeding parts to said star wheel assembly;
   said star wheel having part receiving axially extending sockets rotatable to dispose parts in the path of said holder shells and axially extending curved suction pads at said sockets for engaging the side surfaces of the parts;
   means for selectively applying a vacuum to said parts via said pads to grip parts and remove them from said conveyor means, and for selectively releasing the vacuum to release the parts to said shells; and
   means for relatively axially moving said holders to bring said parts into engagement and relatively revolving said holder shells to friction weld the parts.

10. The combination set forth in claim 9 in which said means for selectively applying a vacuum comprises a fixed vacuum manifold and a distributor rotatable with said star wheel and having ports communicating at times with said manifold dependent on the rotary position of said distributor.

11. The combination set forth in claim 10 in which the ports in said distributor are spaced circumferentially to align with each socket, and are connected to each pad.

12. A method of friction welding pairs of container and like synthetic plastic parts wherein axially mating parts are held in axially aligned upper and lower holder shells having part receiving cavities with entrance ends, and at least one of the shells of each pair has an interior surface formed partly to the configuration of the part received therein, the said one shell and parts received therein having circumferentially mating, circumferentially spaced, generally axially extending grooves and projections and an enlarged cavity portion relative to the parts received forming a part surrounding vacuum chamber means axially outward of said grooves, bounded by an outer portion which conforms to the shape of the parts received to outwardly seal said chamber means comprising the steps of:
   feeding pairs of mating parts into axial alignment with said shells;
   moving said shells and mating parts relatively to receive the mating parts within the shells;
   applying a vacuum to said chamber means via said grooves;
   relatively rotating each shell with the surface having grooves and its mating shell, and moving said shells and mating parts relatively axially to bring the mating parts into engagement and friction weld them together; and
   thereafter breaking the vacuum in each chamber means to permit release of the parts held by the shells.

13. The method of claim 12 wherein the vacuum is broken by communicating a source of compressed gas with said grooves.

14. In a friction welding machine:
    at least a pair of upper and lower holder shells, having part receiving cavities with entrance ends to which upper parts with open reduced diameter necks and lower container parts, to be friction welded together, are fed;

at least one set of said shells including an outer peripheral wall portion with an interior surface formed partly to the configuration of the part to be received therein bounded by an inner end wall;

means for feeding parts to said shells in a manner such that the open upper necks of the upper parts are fed neck first, axially into said set of shells to lie adjacent the said inner end walls thereof;

mating circumferentially spaced, generally axially extending grooves and projections provided on said shells and parts;

means for holding the axially opposite parts in the other holder of each set;

means for relatively axially moving said holders to bring said parts into engagement and relatively revolving said holders to friction weld the parts; and port means in said end walls radially inward of said peripheral wall portions and the open necks of said parts leading axially through said end walls to communicate the atmosphere with the interior of parts in the shells to break any vacuum inside the joined parts which would tend to collapse them.

References Cited

UNITED STATES PATENTS

| | | | |
|---|---|---|---|
| 3,297,504 | 1/1967 | Brown et al. | 156—73 |
| 3,316,135 | 4/1967 | Brown et al. | 156—580 |
| 3,499,068 | 3/1970 | Brown | 156—73 |
| 3,446,688 | 5/1969 | Flax | 156—73 |
| 3,607,581 | 9/1971 | Adams | 156—73 |
| 3,669,809 | 6/1972 | Brown | 156—580 |

DOUGLAS J. DRUMMOND, Primary Examiner

U.S. Cl. X.R.

156—580